No. 786,619. PATENTED APR. 4, 1905.
R. V. BARRY.
CORN PLANTER.
APPLICATION FILED AUG. 20, 1904.
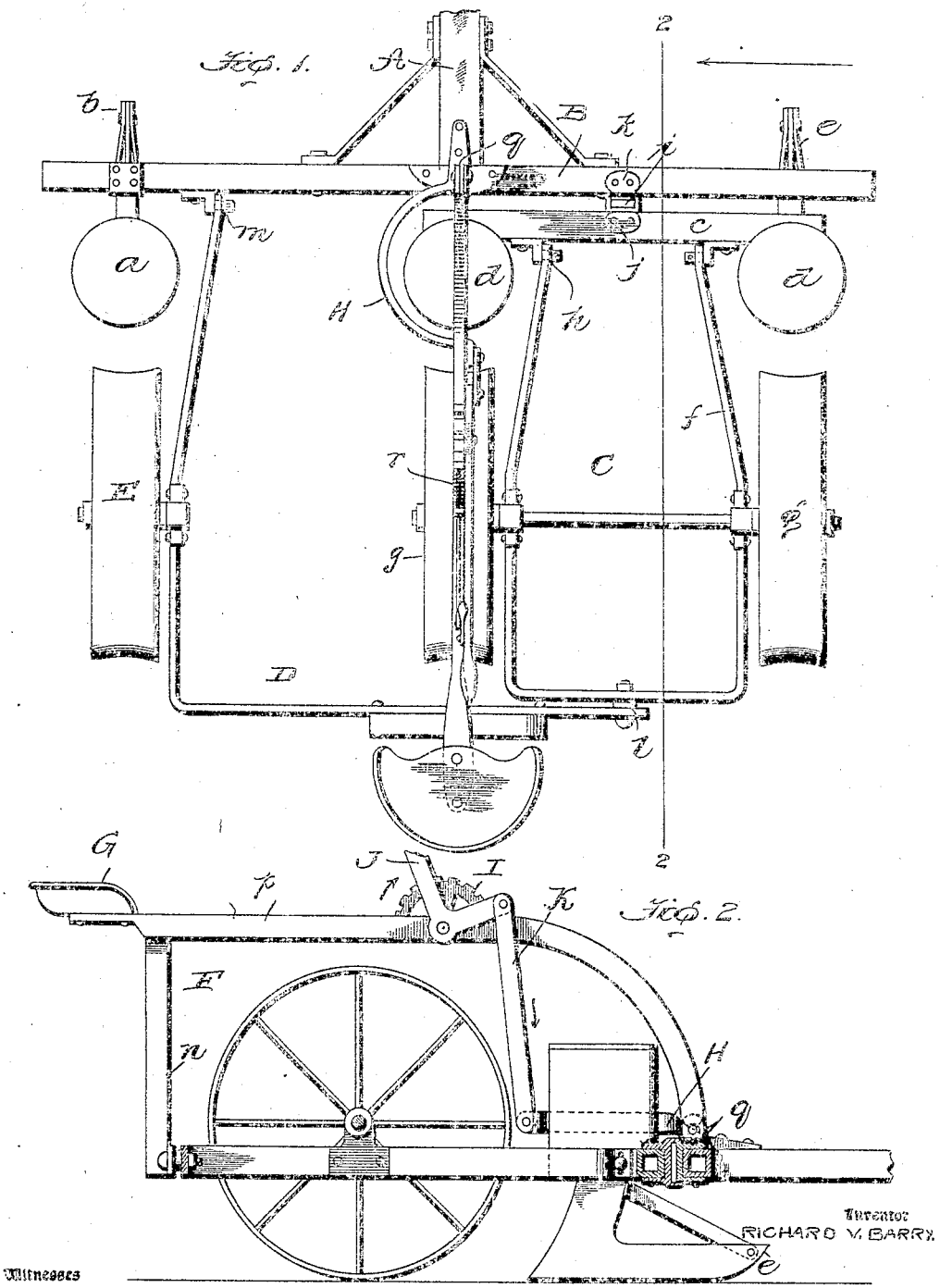

No. 786,619. Patented April 4, 1905.

UNITED STATES PATENT OFFICE.

RICHARD V. BARRY, OF CLINTON, IOWA.

CORN-PLANTER.

SPECIFICATION forming part of Letters Patent No. 786,619, dated April 4, 1905.

Application filed August 20, 1904. Serial No. 221,528.

*To all whom it may concern:*

Be it known that I, RICHARD V. BARRY, a citizen of the United States, residing at Clinton, in the county of Clinton and State of Iowa, have invented new and useful Improvements in Corn-Planters, of which the following is a specification.

My invention pertains to corn-planters; and it has for its object to provide a three-row corn-planter which is simple and inexpensive in construction, is light of draft, and is able to accommodate itself to hilly or uneven ground, and hence adapted to plant the corn at the same depth in the three rows.

With the foregoing in mind the invention will be fully understood from the following description and claims when taken in connection with the accompanying drawings, forming part of this specification, in which—

Figure 1 is a plan view of my novel three-row corn-planter, and Fig. 2 is a vertical section taken in the plane indicated by the line 2 2 of Fig. 1 looking in the direction indicated by the arrow.

Similar letters designate corresponding parts in both views of the drawings, referring to which—

A is the tongue or pole of the planter, which is preferably of wood, and B is a cross-bar, preferably a hollow metallic bar fixedly connected to the rear end of the tongue or pole and extending at either side of the same. The said cross-bar B is provided at one end, preferably its left-hand end, with a seedbox $a$, a runner or furrow-opener $b$, and seed-dropping mechanism. The said seed-dropping mechanism *per se* forms no part of my present invention, and hence I have deemed it unnecessary to illustrate the same.

C is a frame disposed in rear of one half, preferably the right-hand half, of the cross-bar B. The said frame C comprises a cross-bar $c$, equipped with seedboxes $d$, runners $e$, and seed-dropping mechanism, (not shown,) and a U-shaped section $f$, disposed in rear of the bar $c$ and equipped with combined supporting and seed-covering wheels $g$, disposed in alinement with the seedboxes $d$ and the runners $e$. The cross-bar $c$ and the U-shaped section $f$ are pivotally connected together at the forward end of the section $f$ in such manner as to enable the said section $f$ to swing vertically on the said cross-bar $c$, while the frame C as a whole is pivotally connected to the cross-bar B at $i$ in such manner as to enable the said frame as a whole to oscillate or rock laterally or in the direction of the width of the planter. The connection $i$ may be of any character compatible with the purposes of my invention, although I prefer to have it comprise a socket member $j$, fixed to the bar $c$, and a member $k$, fixed to the bar B and arranged in a pivotal manner in the member $j$, as clearly shown in Fig. 1.

D is a frame which describes a right angle and is pivotally connected at $l$ to the rear portion of the section $f$ of the frame C and at $m$ to the bar B adjacent to the left-hand end thereof. E is a combined supporting and covering wheel carried by the forwardly-reaching arm of the frame D and arranged in alinement with the seedbox $a$ and the runner $b$; F, a seat-support comprising a U-shaped upright $n$, connected to and rising from the transverse portion or arm of the angular frame D, and a longitudinal central bar $p$, fixedly connected adjacent to one of its ends to the upright $n$ and pivotally connected at its opposite end to a bracket $q$, fixed with respect to the tongue A; G, a driver's seat located on the rear portion of the support F; H, a bar fixed at its forward end with respect to the tongue A and curved horizontally, as best shown in Fig. 1, so as to clear the left-hand seedbox $d$ of the frame C; I, a segmental rack arranged on the longitudinal central bar $p$ of the support F; J, a bell-crank lever fulcrumed on said bar $p$ and carrying a detent $r$, arranged to engage the rack I, and K a link interposed between and pivotally connected to the lower arm of the said lever J and the rear end of the curved bar H. In virtue of the pivotal connection between the forward end of the bar $p$, the pivotal connections $h$ between the section $f$ and the bar $c$ of the frame C, and the pivotal connection $m$ between the frame D and the bar B it will be observed that the said frames C and D are free to swing or rock vertically with respect to the tongue A and cross-bar B. It will also be observed that the said frames C and D are free to rock vertically in their respective wheels $g$ and E. From this it follows that when the lever J is released from the rack I and moved forwardly the link K, operating against the curved bar H, will depress the forward portions of the frames C and D, while when the said lever J is rocked rearwardly the forward portions of the frames C and D will be raised. In the manner described the depth of the furrows which the runners $b$ and $c$ are adapted to make may be readily regulated, and it will also be observed that the forward portion of the planter may be raised evenly from the ground, as is desirable when making a turn at one end of a field.

In virtue of the frames C and the frame formed by the frame D and the bar B being adapted to oscillate transversely with respect to each other, it will be observed that the planter as a whole is adapted to adjust itself to very uneven and hilly ground and assure the corn being planted at a uniform depth in the three rows.

With the exception of the tongue A all of the parts of my improved planter are preferably formed of metal.

It will be appreciated from the foregoing that my novel three-row planter is very simple and inexpensive in construction, is durable, since it comprises no delicate parts such as are likely to get out of order after a short period of use, and is very light of draft, this latter because of the ability of the wheels $g$ and E and the runners $b$ and $e$ to accommodate themselves to unevenesses of the ground.

I have entered into a detailed description of the construction and relative arrangement of the parts embraced in the present and preferred embodiment of my invention in order to impart a full, clear, and exact understanding of the said embodiment. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a corn-planter, the combination of a tongue, a cross-bar fixed with respect to the tongue, a right-angle, wheel-supported frame having a forwardly-reaching arm pivotally connected to the said cross-bar and arranged to swing vertically thereon and also having a transverse arm fixed with respect to and extending inwardly from the forwardly-reaching arm, and a wheel-supported frame interposed between and pivotally connected to the cross-bar and the inwardly-extending, transverse arm of the right-angle frame and arranged to rock in the direction of the width of the planter.

2. In a corn-planter, the combination of a tongue, a cross-bar fixed with respect to the tongue and equipped adjacent to one of its ends with a seedbox and a runner, a right-angle frame having a forwardly-reaching arm pivotally connected to the said cross-bar and arranged to swing vertically thereon and also having a transverse arm fixed with respect to and extending inwardly from the forwardly-reaching arm, a combined supporting and covering wheel carried by the forwardly-reaching arm of the right-angle frame and arranged in rear of the said seedbox and runner, and a frame comprising a forward bar equipped adjacent to its ends with seedboxes and runners; said bar being pivotally connected to the cross-bar on the tongue and arranged to rock in the direction of the width of the planter on said bar, a section pivotally connected to and arranged to swing vertically on said forward bar and pivotally connected to the transverse arm of the right-angle frame and arranged to swing in the direction of the width of the planter on said transverse arm, and combined supporting and covering wheels carried by the said section.

3. In a corn-planter, the combination of a tongue, a cross-bar fixed with respect to the tongue and equipped adjacent to one of its ends with a seedbox and a runner, a right-angle frame having a forwardly-reaching arm pivotally connected to the said cross-bar and arranged to swing vertically thereon, and also having a transverse arm fixed with respect to and extending inwardly from the forwardly-reaching arm, a combined supporting and covering wheel carried by the forwardly-reaching arm of the right-angle frame and arranged in rear of the said seedbox and runner, a frame comprising a forward bar equipped adjacent to its ends with seedboxes and runners; said bar being pivotally connected to the cross-bar on the tongue and arranged to rock in the direction of the width of the planter on said bar, a section pivotally connected to and arranged to swing vertically on said forward bar and pivotally connected to the transverse arm of the right-angle frame and arranged to swing in the direction of the width of the planter on said transverse arm, and combined supporting and covering wheels carried by the said section, a seat-support fixedly connected to the transverse arm of the right-angle frame and pivoted with respect to the tongue, a curved bar fixed with respect to the tongue and extending rearwardly around the middle seedbox, a lever fulcrumed on the seat-support and connected with the said curved bar, and means for adjustably fixing the said lever with respect to the seat-support.

In testimony whereof I have hereunto set my hand in presence of two subscribing witnesses.

RICHARD V. BARRY.

Witnesses:
T. R. MURRAY,
M. F. McGINN.